United States Patent [19]

Ito et al.

[11] 4,001,035
[45] Jan. 4, 1977

[54] COLORING COMPOSITION

[75] Inventors: Masahiko Ito, Kasukabe; Hiromichi Wada, Yashio; Fumio Kondo, Toride; Fukio Kai, Kawaguchi, all of Japan

[73] Assignee: Dainichiseika Color & Chemicals Mfg. Co. Ltd., Tokyo, Japan

[22] Filed: Oct. 6, 1975

[21] Appl. No.: 619,929

Related U.S. Application Data

[63] Continuation of Ser. No. 490,744, July 22, 1974, abandoned.

[30] Foreign Application Priority Data

Jan. 16, 1974 Japan .................................. 49-7009

[52] U.S. Cl. .................................. 106/307; 106/204; 106/241; 106/308 Q; 106/308 C; 106/308 M; 106/309; 260/24; 260/26; 260/37 R; 260/37 N; 260/40 R; 260/42.21; 260/42.44; 260/42.45; 260/42.55; 260/42.57

[51] Int. Cl.$^2$ .................................. C08J 3/22
[58] Field of Search ............... 260/42.44; 106/241, 106/204, 308 M, 308 Q, 308 C, 309, 307

[56] References Cited

UNITED STATES PATENTS

| | | | |
|---|---|---|---|
| 3,437,503 | 4/1969 | Massam et al. | 106/309 |
| 3,458,804 | 7/1969 | Wolf et al. | 106/308 |

*Primary Examiner*—James H. Derrington
*Attorney, Agent, or Firm*—Oblon, Fisher, Spivak, McClelland & Maier

[57] ABSTRACT

A coloring composition which comprises a pigment, a carrier resin and an organic compound, such as a phenol or an amine, containing an active hydrogen atom, which composition is mixed under high shear stress.

12 Claims, No Drawings

COLORING COMPOSITION

This is a continuation of application Ser. No. 490,744, filed July 22, 1974, now abandoned.

BACKGROUND OF THE INVENTION

1. Field of the Invention

The present invention relates to a coloring composition comprising a pigment and a carrier resin, which composition is easily dispersed in various vehicles or used in various products.

2. Description of the Prior Art

Products prepared by treating a pigment with a carrier, such as a natural or synthetic resin, have been known as pigment concentrates, color master batches or treated pigments and have been used as coloring materials. The most important property of a good coloring composition is high dispersibility in the product which is to be colored.

Methods of blending a pigment and a carrier resin include dry-blending of both components; co-precipitation of a pigment and a carrier by dissolving the carrier in a solvent and mixing the solution with a precipitating solvent; melt-kneading with an extruder; flashing; or crushing by high shear and high impact stress in the presence of an abrasive auxiliary agent, e.g., an inorganic salt. However, when highly abrasive auxiliary agents are used or high shear stress is applied in the treatment of carrier resins which are easily deteriorated, the resulting coloring composition may possess low miscibility or low dispersibility in the vehicle or in the product which is to be colored.

Accordingly, the preparation of high quality, highly dispersible pigment-containing coloring compositions has been difficult. A need exists therefore for a coloring composition which is easily dispersible in vehicles or in products to be colored.

SUMMARY OF THE INVENTION

Accordingly, one object of the present invention is to provide a coloring composition having high dispersibility in vehicles or in products to be colored.

Briefly, this object and other objects of the invention as will hereinafter become more readily understood can be attained by a coloring composition comprising a pigment, a carrier resin and an organic compound, such as a phenol or an amine, containing an active hydrogen atom which are mixed under high shearing stress.

DETAILED DESCRIPTION OF THE PREFERRED EMBODIMENTS

Suitable pigments used in the invention include conventional organic or inorganic pigments, such as azo, phthalocyanine, quinacridone, anthraquinone, dioxazine, indigo, thioindigo, perynon, perylene, isoindolenine, titanium dioxide, cadmium, iron oxide, chromium oxide, carbon black, and the like. Since carbon black (furnace or channel type) causes substantial deterioration of the carrier resin under high shear stress, the effect of the invention is especially marked when a carbon black pigment is used.

Suitable carrier resins include natural resins, synthetic polymers and copolymers, such as polyethylene, polypropylene, polyvinylchloride, polyvinylidene chloride, polyvinyl acetate, polyacrylate, polymethacrylate, polyacrylonitrile, polystyrene, polybutene, polyamide, polyester, polyether, polycumarone-indene, petroleum resin, ABS resin, AS resin, polyurethane resin, cellulose diacetate, cellulose triacetate, paraffin wax, copal, shellac, rosin, rosin ester, modified rosin, phenol resin, urea resin, melamine resin, unsaturated polyester resin, epoxy resin, and others. Rosin carrier resins will badly deteriorate under high shear stress. Vinylchloride-vinylacetate copolymer, polyacrylic resins, e.g., polyacrylonitrile, polyacrylate, polymethacrylate; and polyamide, cellulose diacetate, cellulose triacetate, polyurethane, unsaturated polyesters and others will also substantially deteriorate. Accordingly, the effect of the invention is especially notable when these resins are used as carrier resins.

Suitable rosins include rosin, rosin esters, modified rosins or the like. Rosins include natural resins, such as abietic acid, tetrahydroabietic acid, dihydroabietic acid, neoabietic acid, α-pimaric acid, dehydroabietic acid, and other resinic acids, as main components. Rosin esters include various alcohol esters of abietic acid, such as rosin glyceryl esters, rosin pentaerythrityl esters, rosin monoethylene glycol esters and the like. Modified rosins are prepared by modifying various resins with rosin, and include rosin modified alkyd resins, rosin modified phenol resins, maleic rosin modified alkyd resins, hard rosins, or the like.

Rosin esters are the preferable rosin resins. When the ratio of pigment to carrier resin is too high, the dispersibility of the coloring composition will be insufficient. On the other hand, when the ratio is too low, the process becomes uneconomical. Accordingly, the pigment concentration in the coloring composition is usually 10 – 90 wt %, preferably 30 – 70 wt %.

The organic compounds containing an active hydrogen atom include polymerization inhibitors, polymerization retardants and antioxidants, such as phenol compounds or amine compounds containing an active hydrogen atom, such as phenols, e.g. 1,1-bis(4-hydroxyphenyl)cyclohexane, 4,4'-thio-bis(6-tert-butyl-3-methylphenyl)methylated diphenyl, 2,6-di-tert-butyl-4-methylphenol, 2,2'-methylene-bis(4-methyl-6-tert-butylphenol), 4,4'-butylidene-bis(6-tert-butyl-3-methylphenol), di-tert-butyl-p-cresol, hydroquinone monobenzyl ether, dialkylphenol sulfide, or the like; primary or secondary amines, e.g., p,p-diphenylenediamine, p,p'-dinaphthylenediamine, phenyl-α-naphthylamine, phenyl-β-naphthylamine, N,N'-di-β-naphthyl-p-phenylenediamine, p,p'-dimethoxydiphenylamine, N-phenyl-N'-isopropyl-p-phenylenediamine, acetonediphenylamine reaction product, 6-ethoxy 1,2-dihydroxy-2,2,4-trimethyl quinoline or the like; and other compounds, e.g. mercapto benzimidazole dilauryl thiodipropionate, tri-(nonyl-phenyl)-phosphate, distearyl thiodipropionate, p-benzoquinone, hydroquinone, catechol, tert-butyl catechol, nitrosobenzene, picric acid, dithiobenzoyl disulfide or the like. The phenol and amino compounds containing an active hydrogen atom impart a marked effect in the invention. A mixture of the compounds may also be used.

The amount of the active hydrogen compound in the coloring composition should be in the range of 0.05 – 5% by weight, preferably 0.1 – 2% by weight. In addition to the three basic components of the coloring composition, suitable amounts of various conventional additives, such as fillers, surfactants, dispersing agents, stabilizers, plasticizers, or the like may be added to form the coloring compositions suitable for various applications.

A suitable process for preparing the coloring composition of the invention is the conventional blend-crushing method. High shear stress methods, such as roll milling, kneading, Bumbury mixing, ball milling or the like are preferable. When the high shear stress method is applied for blend-crushing a mixture of the pigment and the carrier resin only, the carrier resin will usually deteriorate and impart a low dispersibility to the coloring composition. However, in the invention, the deterioration of the carrier resin is inhibited by adding an organic compound containing an active hydrogen atom during the blend-crushing of the pigment and the carrier resin, whereby the disadvantages of low dispersibility and low miscibility are overcome.

An inorganic salt, e.g., sodium chloride, sodium sulfate or the like is preferably added as an auxiliary crushing agent during the blend-crushing method to provide high shear stress in a kneader, for example. Furthermore, the addition of a relatively small amount of a hydrophilic organic solvent such as dimethylformamide, diacetone alcohol, methylethyl ketone, ethyleneglycol monomethyl ether, ethyleneglycol monoethyl ether is also preferable. The amounts of the inorganic salt and the hydrophilic organic solvent are not limited but usually are about 0.5 – 3 parts by weight of the inorganic salt and about 0.1 – 1 parts by weight of the organic solvent to 1 part by weight of the total of pigment and carrier resin. The inorganic salt and the hydrophilic organic solvent can be easily removed by washing with water or drying after the blend-crushing.

The mechanism of action of the organic compound containing the active hydrogen atom is not clear. However, when the pigment and the carrier resin are crushed under high shear stress, free radical formation caused by the shear stress on the mixture is believed to occur, and deterioration of the carrier resin occurs by a free radical mechanism so as to thus decrease the miscibility of the product, which will be colored and to produce low dispersibility of the pigment. Accordingly, free radical formation is stopped by adding the organic compound containing the active hydrogen atom, whereby a coloring composition with high miscibility and pigment dispersibility will result.

When the coloring composition prepared by the process of the invention is combined with a vehicle, such as one for paint, for printing ink, or for surface treatment, the coloring composition will be easily, uniformly and finely dispersed by a simple dispersing method, such as simple stirring, to produce a colored product of excellent quality. A colored spinning solution for spinning a synthetic polymer, such as polyacrylonitrile, polyurethane, polyvinyl chloride, or the like can be produced by adding the coloring composition to the synthetic polymer. In a coloring mold various synthetic resins may be uniformly colored because of the high dispersibility and miscibility of the coloring composition.

In the preferred embodiment of the invention, a rosin resin is combined with carbon black in the presence of a polymerization or inhibitor or a polymerization retardant. It is preferable to use 10 – 90 wt%, most preferably 30 – 70 wt% of carbon black with 90 – 10 wt%, preferably 30 – 70 wt%, of the rosin resin. A suitable polymerization inhibitor or retardant is an organic compound which reacts with a free radical, as stated above. In the mixing, an organic salt or a solvent is preferably admixed with the inhibitor or retardant with high shearing so as to enhance the effect of the polymerization inhibitor or retardant.

Having generally described the invention, a more complete understanding can be obtained by reference to certain specific examples, which are included for purposes of illustration only and are not intended to be limiting unless otherwise specified.

EXAMPLE 1

A kneader equipped with a jacket for heating and cooling, and a pressurizing cover was charged with 50 parts of channel carbon black, 50 parts of rosin glycerin ester, 25 parts of dimethylformamide, 100 parts of sodium sulfate and 0.5 parts of 2,6-di-tert-butyl-p-cresol. The mixture was kneaded with heating. When the mixture reached a viscous fluid state, cooling was started and the kneading was continued for 1 hour. And then, 25 parts of water was added to the mixture to separate the kneaded product. The product was crushed in the kneader under pressure. The crushed product was washed with water on a suction filter for about 5 hours until the sodium sulfate and dimethylformamide were completely removed, and then was dried for 12 hours in a hot air drier at 70° C to give 88.2 parts of a coloring composition containing carbon black. When 20 parts of the coloring composition were mixed with 80 parts of xylene while stirring, the coloring composition was easly dispersed. The resulting xylene solution (5.6 parts) was mixed with 92 parts of a melamine alkyd varnish to give a black varnish with excellent dispersibility.

EXAMPLE 2

The process of Example 1 was repeated except that 60 parts of furnace carbon black, 40 parts of a rosin modified phenol resin, 13.5 parts of dimethylformamide and 0.8 parts of N-isopropyl-N'-phenyl-p-phenylenediamine were used to give a black varnish with high dispersibility.

EXAMPLE 3

A mixture of 40 parts of furnace carbon black, 60 parts of a rosin ester and 1.2 parts of 4,4'-butylidene-bis(6-tert-butyl-m-cresol) was melted on a three-roller-mill heated at 120° C, and was passed 5 times through the roller-mill to disperse the carbon black. The mixture was removed from the roller-mill, cooled and crushed with a hammer mill to give 86 parts of a coloring composition containing carbon black. When 8.8 parts of the coloring composition were mixed with 35.2 parts of mineral turpentine, a uniform dispersion was easily prepared. A black varnish which dried at room temperature and which had excellent dispersibility was produced by mixing 722 parts of an alkyl resin varnish (Phthalkyd 355–50) with the above dispersion.

EXAMPLE 4

The process of Example 3 was repeated except that 35 parts of copper phthalocyanine Green, 65 parts of a rosin ester, 0.5 parts of phenyl-α-naphthylamine and 5 parts of diacetonealcohol were used to give 87.5 parts of a green coloring composition. A green varnish which dried at room temperature and which had excellent dispersibility was produced by mixing the green composition with the alkyd resin varnish as in Example 3.

EXAMPLE 5

The process of Example 1 was repeated except that 50 parts of dioxazine Violet, 50 parts of polyurethane, 150 parts of sodium chloride, 45 parts of dimethylformamide, and 0.8 parts of 2,5-di-tert-butyl-hydroquinone were added to the kneader of Example 1 to obtain 82 parts of a violet coloring composition. The coloring composition (20 parts) was easily dissolved in 80 parts of a solvent mixture composed of 50 parts of methylethylketone and 25 parts of cyclohexanone with stirring. A violet coating composition which had excellent transparency for use in synthetic leather was prepared by mixing 4.0 parts of the resulting solution and 96 parts of a polyurethane resin varnish.

EXAMPLE 6

The process of Example 1 was repeated except that 60 parts of an insoluble azo pigment, 40 parts of powdered polyacrylonitrile (degree of polymerization about 1200), 100 parts of sodium chloride, 75 parts of dimethylformamide, and 0.9 parts of N,N'-diphenyl-p-phenylenediamine were added to the kneader of Example 1, to give 80 parts of a yellow composition for polyacrylonitrile. The coloring composition (12.5 parts) was dissolved in 87.5 parts of dimethylformamide. The resulting solution (3.7 parts) was added to 46 parts of a spinning composition composed of 17 parts of polyacrylonitrile dissolved in 83 parts of dimethylformamide, and the mixture was sufficiently stirred and deaerated overnight. The colored spinning composition was extruded through a nozzle containing 100 holes, 0.08 mm in diameter in n-butanol at room temperature, to give 5.2 parts of a yellow colored polyacrylonitrile yarn.

EXAMPLE 7

The process of Example 3 was repeated except that 40 parts of dimethylquinacricone, 60 parts of vinylchloride-vinylacetate copolymer, 25 parts of methylethyl ketone and 1.2 parts of 2-mercaptobenzimidazole were mixed through the three roller-mill of Example 3 to give 82 parts of a red coloring composition. The coloring composition (0.15 parts) was blended with 55 parts of a plasticized polyvinylchloride compound melted on a two-roller mill heated at 150° C, and the mixture was continuously blended for 5 minutes to give a red polyvinylchloride sheet with excellent transparency.

EXAMPLE 8

The kneader of Example 1 was charged with 55 parts of copper phthalocyanine Blue, 45 parts of a polyamide resin, 62 parts of n-butanol, and 0.8 parts of aldol-α-naphthylamine and the mixture was kneaded for 2 hours. The mixture was treated for 10 hours in a vacuum of 20 mm Hg to remove the n-butanol and was crushed with a hammer mill to give 79 parts of a coloring composition. A coloring solution (2.8 parts) consisting of 20% of the above coloring composition and 80% of a solvent mixture composed of benzene and isopropanol (1 : 1) was added to 40 parts of a varnish prepared by dissolving 20% of a vinylchloride-vinylacetate copolymer, 5% of ethylcellulose, and 5% of polyamide in 70% of a solvent mixture composed of methylethyl ketone, toluene and cyclohexanone (1 : 1 : 1). The mixture was well stirred to give a transparent blue gravure printing ink with excellent dispersibility.

REFERENCE

The process of Example 1 was repeated without adding 2,6-di-tert-butyl-p-cresol, to give a black composition. The black composition did not disperse in xylene when a melamine-alkyd varnish was mixed with the black composition to attempt to form a paint. According to microscopic observation, the carbon black particles had a particle diameter of 10 – 30μ so that the product could not be practically used.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A coloring composition prepared by the process comprising mixing under high shear stress:
    a. 10 to 90 wt% based on the total a and b of a pigment;
    b. 90 to 10 wt% based on the total a and b of a carrier resin; and
    c. 0.05 to 5 wt% based on the total a and b of an organic compound having an active hydrogen atom; selected from the group consisting of phenols, primary or secondary amines, mercaptobenzimidazole, dilauryl thiodipropionate, tri-(nonylphenyl) phosphate, distearyl thiodipropionate, p-benzoquinone, hydroquinone, catechol, tert-butyl catechol, nitrosobenzene, picric acid, dithiobenzoyl disulfide and mixtures thereof; in the presence of 0.5 to 3 wt parts of a water soluble inorganic salt per part of the total a and b, and 0.1 to 1 wt part per part of total a and b of a hydrophilic solvent selected from the group consisting of dimethylformamide, diacetone alcohol, methylethyl ketone, ethyleneglycol monomethyl ether and ethyleneglycol monoethyl ether; and separating said coloring composition from the inorganic salt and hydrophilic solvent by washing with water.

2. The coloring composition of claim 1, wherein the organic compound containing an active hydrogen atoms is 1,1-bis(4-hydroxyphenyl)cyclohexane, 4,4'-thio-bis(6-tert-butyl-3-methylphenyl)methylated diphenyl, 2,6-di-tert-butyl-4-methylphenol, 2,2'-methylene-bis(6-tert-butyl-4-methylphenol), 2,2'-methylene-bis(4-methyl-6-tert-butylphenol), 4,4'-butylidene-bis(6-tert-butyl-3-methylphenol), di-tert-butyl-p-cresol, hydroquinone monobenzyl ether, dialkyl phenol sulfide, p,p-diphenylenediamine, p,p'-dinaphthylenediamine, phenyl-α-naphthylamine, phenyl-β-naphthylamine, N,N'-di-β-naphthyl-p-phenylenediamine, p,p'-dimethoxydiphenylamine, N-phenyl-N'-isopropyl-p-phenylenediamine, acetone-diphenylamine reaction product, 6-ethoxy 1,2-dihydroxy-2,2,4-trimethylquinoline, mercaptobenzimidazole, dilauryl thiodipropionate, tri-(nonylphenyl)phosphate, distearyl thiodipropionate, p-benzoquinone, hydroquinone, catechol, tert-butyl catechol, nitrosobenzene, picric acid or dithiobenzoyl disulfide.

3. The coloring composition of claim 1, wherein the carrier resin is a resin which decomposes under high shear stress.

4. The coloring composition of claim 1, wherein the carrier resin is selected from the group consisting of rosin resins, rosin modified resins, vinylchloride-vinylacetate copolymers, polyacrylates, polymethacrylates, polyacrylonitrile, polyamides, cellulose acetates, polyurethanes and unsaturated polyesters.

5. The coloring composition of claim 1, wherein the pigment is carbon black.

6. The coloring composition of claim 1, wherein a rosin resin, carbon black and a polymerization inhibitor or retardant are mixed under high shearing.

7. A process for preparing a coloring composition comprising mixing under high shear stress:
   a. 10 to 90 wt% based on the total of a and b of a pigment;
   b. 90 to 10 wt% based on the total of a and b of a carrier resin; and
   c. 0.05 to 5 wt% based on the total of a and b of an organic compound having an active hydrogen atom, selected from the group consisting of phenols, primary or secondary amines, mercaptobenzimidazole, dilauryl thiodipropionate, tri-(nonylphenyl) phosphate, distearyl thiodipropionate, p-benzoquinone, hydroquinone, catechol, tert-butyl catechol, nitrosobenzene, picric acid, dithiobenzoyl disulfide and mixtures thereof in the presence of 0.5 to 3 wt parts of a water soluble inorganic salt per part of total a and b, and 0.1 to 1 wt part per total a and b of a hydrophilic solvent selected from the group consisting of dimethylformamide, diacetone alcohol, methylethyl ketone, ethyleneglycol monomethyl ether and ethyleneglycol monoethyl ether; and
   separating said coloring composition from the inorganic salt and hydrophilic solvent by washing with water.

8. The process of claim 7 wherein the organic compound containing an active hydrogen atoms is 1,1-bis(4-hydroxyphenyl)-cyclohexane, ,4'-thio-bis(6-tert-butyl-3-methylphenyl)methylated diphenyl,2,6-di-tert-butyl-4-methylphenol, 2,2'-methylene-bis(6-tert-butyl-4-methylphenol), 2,2'-methylene-bis(4-methyl-6-tert-butylphenol), 4,4'-butylidene-bis(6-tert-butyl-3-methylphenol), di-tert-butyl-p-cresol, hydroquinone monobnezyl ether, dialkyl phenol sulfide, p,p-diphenylenediamine, p,p'-dinaphthylenediamine, phenyl-α-naphthylamine, phenyl-β-naphthylamine, N,N'-di-β-naphthyl-p-phenylenediamine, p,p'-dimethoxydiphenylamine, N-phenyl-N'-isopropyl-p-phenylenediamine, acetone-diphenylamine reaction product, 6-ethoxy-1,2-dihydroxy-2,2,4-trimethylquinoline, mercaptobenzimidazole, dilauryl thiodipropionate, tri(-nonylphenyl) phosphate, distearyl thiodipropionate, p-benzoquinone, hydroquinone, catechol, tert-butyl catechol, nitrosobenzene, picric acid or dithiobenzoyl disulfide.

9. The process of claim 7, wherein the carrier resin is a resin which decomposes under high shear stress.

10. The process of claim 7, wherein the carrier resin is selected from the group consisting of rosin resins, rosin modified resins, vinyl chloride-vinyl acetate copolymers, polyacrylates, polymethacrylates, polyacrylonitriles, polyamides, cellulose acetates, polyurethanes and unsaturated polyesters.

11. The process of claim 7, wherein the pigment is carbon black.

12. The process of claim 7, wherein a rosin resin, carbon black, and an organic compound having an active hydrogen atom are mixed under high shearing.

* * * * *